United States Patent [19]

Banach et al.

[11] Patent Number: 4,766,497
[45] Date of Patent: Aug. 23, 1988

[54] IF CIRCUIT WITH REDUCED SOUND ATTENUATION FOR CABLE SIGNALS

[75] Inventors: Frank G. Banach, Oak Lawn; James G. Haerle, Streamwood; David S. Tait, Wood Dale, all of Ill.

[73] Assignee: Zenith Electronics Corporation, Glenview, Ill.

[21] Appl. No.: 46,962

[22] Filed: May 6, 1987

[51] Int. Cl.$^4$ ............................ H04N 5/62; H04N 7/10
[52] U.S. Cl. ..................................... 358/188; 358/86; 358/196; 455/3
[58] Field of Search ............ 358/188, 181, 189, 191.1, 358/196, 86, 22; 455/3, 133, 140

[56] References Cited
U.S. PATENT DOCUMENTS

| 4,109,280 | 8/1978 | Dash | 358/86 |
| 4,312,016 | 1/1982 | Glaab | 358/181 |
| 4,348,691 | 9/1982 | Mistry | 358/86 |
| 4,499,495 | 2/1985 | Strammello | 358/188 |
| 4,633,316 | 12/1986 | Burke | 358/86 |

Primary Examiner—Tommy P. Chin

[57] ABSTRACT

A cable-ready television receiver including a tuner switchable between cable and off-air signals has an LC trap tuned to the audio carrier frequency coupled between the tuner and a SAW IF amplifier. The trap includes a varactor diode that, when it exhibits a large capacitance, effectively disables the trap. This occurs when the receiver is used with cable signals. In the event the receiver is used for off-air signals, the voltage applied to the varactor diode causes it to exhibit a much smaller capacitance which effectively enables the trap.

4 Claims, 1 Drawing Sheet

IF CIRCUIT WITH REDUCED SOUND ATTENUATION FOR CABLE SIGNALS

BACKGROUND OF THE INVENTION AND PRIOR ART

This invention relates generally to cable-ready television receivers and specifically to an intermediate frequency (IF) circuit that is alterable for operation with cable signals and off-air signals.

In intercarrier sound television (TV) receiver systems, the IF circuits process a video carrier of 45.75 MHz, an audio carrier of 41.25 MHz and a 3.58 MHz color subcarrier, which is modulated on the video or picture carrier. As is well-known, when detecting the IF video carrier signal the audio carrier must be suppressed to a low amplitude with respect to the video carrier to avoid cross modulation between carriers, especially between the audio carrier and the color subcarrier. Since the audio carrier must also be recovered, however, it cannot be suppressed to the point that its detection is impaired. Conventional IF circuits include an adjustable audio carrier trap which, by appropriate tuning of its frequency and impedance at resonance, tailors the response characteristic of the IF amplifier circuit at the audio carrier frequency to that which is desired. These techniques are well-known in the art and their use generally provides excellent performance.

In cable television systems, a single coaxial cable carries a multiplicity of TV channels of differing frequencies. The amplifiers at the cable head-end or transmitting station are of necessity wide-band, which enhances the probability of interference between the various carriers present in the TV signal. In an effort to reduce the probability of intermodulation distortion and also to conserve transmitting power most cable systems reduce the audio carrier amplitude with respect to the video carrier amplitude to a greater degree than is their practice with respect to over-the-air signals, hereinafter referred to as "off-air" signals. For example, in a conventional off-air TV signal, the audio carrier is from 7 to 10 db below the picture carrier, whereas in a cable system the audio carrier may be from 17 to 20 db below the picture carrier. These conflicting signal arrangements pose a dilemma for television receiver manufacturers since conventional TVs include a trap at the audio carrier frequency to keep the level of the audio carrier down with respect to the video carrier in the IF signal.

The problem is that most receiver manufacturers produce "cable-ready" TV receivers in which standard VHF and UHF channels as well as cable channels that extend from the VHF television frequency range up into portions of the UHF range, are tunable. Some type of switching is generally incorporated on the front panel of such TVs to enable the user to select between cable and off-air signal reception. Consequently, the TV may be used with either (or both) off-air and cable signals. As will be seen, the audio trap poses a problem with cable signals.

Another advance in TV performance has been brought about by the use of surface acoustic wave (SAW) filters in IF circuits. The advantages of a SAW filter IF stage are extreme reliability, consistent performance among units and exceptional stability. A major disadvantage of a SAW filter is that it is quite lossy. Therefore, it is desirable that the audio carrier in a cable television IF signal not be further diminished before application to a SAW IF input.

OBJECTS OF THE INVENTION

It is a principal object of the invention to provide a novel IF circuit for a cable-ready television receiver.

Another object of the invention is to provide an IF circuit that is usable with off-air and cable signals.

BRIEF DESCRIPTION OF THE DRAWINGS

Other objects and advantages of the invention will be apparent upon reading the following description in conjunction with the drawings, in which.

DESCRIPTION OF THE PREFERRED EMBODIMENT

Figure 1:
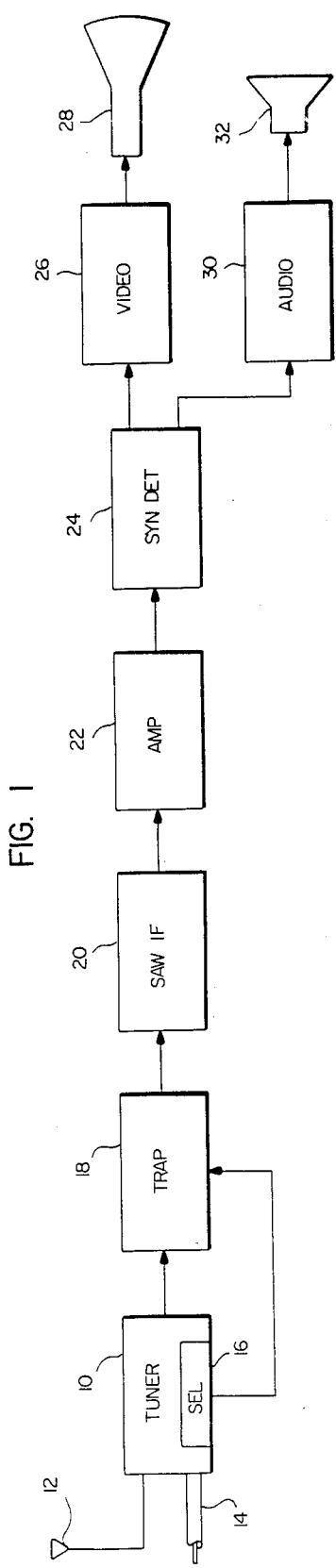
FIG. 1 is a simplified block diagram of a television receiver constructed in accordance with the invention.

Referring to FIG. 1, a tuner means 10 is supplied with input signals from either an antenna 12 or a cable 14. The separate antenna and cable input signals may be applied, through a switch, to a suitable input of tuner means 10, or as shown, may be applied to separate inputs and coupled internally to appropriate tuning circuits of tuner means 10. Tuner means 10 is shown as including a block 16, labelled SEL (for selector), which should be understood to include a suitable switching means for arranging the tuning circuits in tuner 10 to receive signals from either antenna 12 or cable 14. Selector 16 may be mechanically operated or, in accordance with more recent techniques, be voltage controllable circuits coupled to suitable varactor type tuning diodes. Tuner means 10 also includes well-known signal tuning and mixing circuitry for receiving a plurality of TV signal frequencies and converting them to a single IF output signal that is supplied to a trap 18 constructed in accordance with the invention. Trap 18 is shown connected to selector 16 in tuner means 10 for purposes to be explained. The output of trap 18 is supplied to a SAW IF circuit 20, which in turn, supplies an amplifier 22. The output of amplifier 22 is applied to a synchronous detector 24 that has outputs supplying a video circuit 26 for driving a cathode ray tube (CRT) 28 and an audio circuit 30 for driving a loudspeaker 32. With the exception of the arrangement of tuner means 10 and trap 18, the receiver of FIG. 1 is conventional in construction and operation. Consequently, no further details of the operation thereof will be described.

Figure 3:
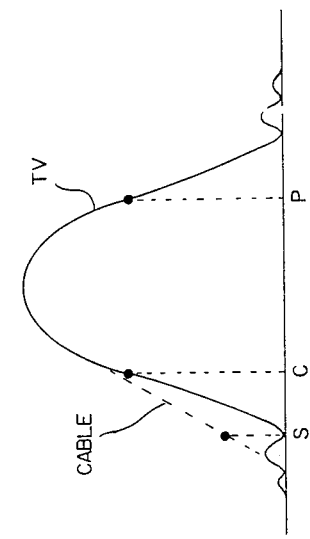
FIG. 3 represents a graph showing the prior art IF response curve and that of the invention.
Figure 2:
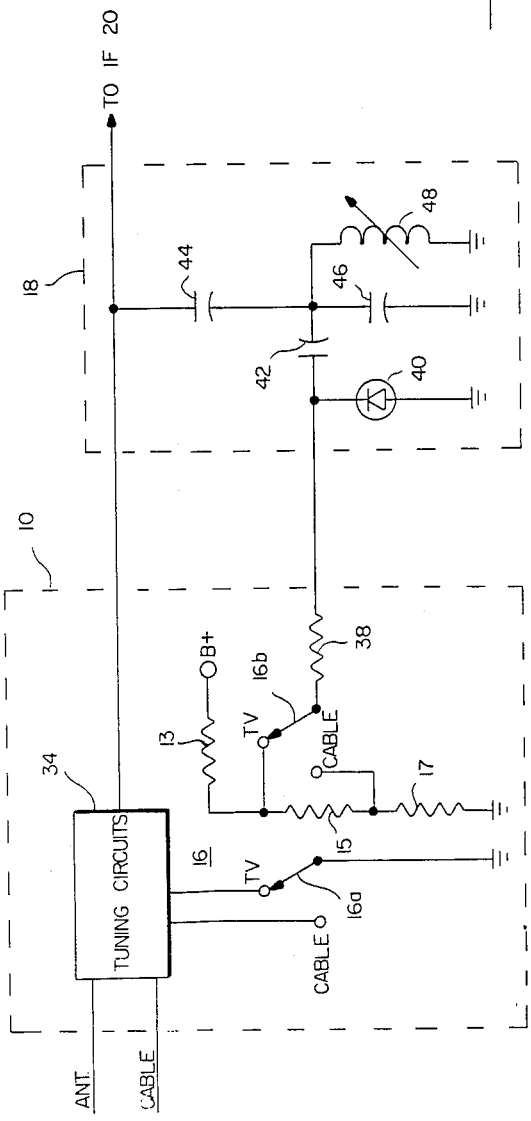
FIG. 2 is a schematic diagram of a portion of the receiver of FIG. 1.

In FIG. 2, tuner means 10 and trap 18 are indicated by the respectively identified dashed line boxes. A block 34 labelled TUNING CIRCUITS is intended to include circuitry for tuning the TV channel frequencies and developing a common IF output signal therefrom. Selector 16 is schematically depicted as a double pole, double throw switch with a one pole labelled 16a and another pole labelled 16b, both poles being operated together. Pole 16a is connected to ground and is switchable between a pair of terminals labelled "cable" and "TV" for enabling operation of appropriate circuitry within tuning circuits 34 (not shown) for selectively processing signals from the antenna or cable inputs. Pole 16b is connectable between a pair of taps on a voltage divider consisting of resistors 13, 15 and 17 serially connected between a source of B+ voltage and ground. The junction of resistor 13 and 15 represents the TV position, and the junction of resistors 15 and 17 represents the cable position. Pole 16b is connected, through a resistor 38, to the junction of a varactor diode 40 and a capacitor 42 in a trap 18. It will be seen that when switch pole 16b is in the TV position, a higher voltage is impressed across varactor diode 40 than is the case when switch 16b is in the cable position. The other terminal of capacitor 42 is connected to the junction of a capacitor 44 and the parallel connection of a capacitor 46 and adjustable coil 48. Varactor diode 40 exhibits a capacitance across its terminals that is a function of the DC voltage applied across it. Therefore, the capacitance of diode 40 and the serially connected capacitance of capacitor 42 cooperate with capacitors 44 and 46 and coil 48 to complete trap 18. When in the TV position, trap 18 is tuned to the audio carrier frequency and is effective to tailor the frequency response to the IF signal to reduce the audio carrier with respect to the video and color carriers. Reference to FIG. 3 will better illustrate this.

In FIG. 3, the solid curve is the IF response produced with sound trap 18 tuned to the audio carrier frequency and being fully effective as is the case for an off-air signal (selector 16 in the TV position). As clearly shown, the response at the audio carrier frequency point (labelled S) is indicated as being down from those at the color (C) and video or picture (P) carrier frequency points. In practice, the audio carrier frequency response is about 25 db down from that at the color and picture carrier frequencies. On the contrary, the dashed line curve for the IF response, which corresponds to selector 16 being in the cable position, shows the response at the audio carrier frequency (S) as being only slightly down from the response at frequencies corresponding to the color and video carriers. In practice, it is about 8 db down. This dashed line curve corresponds to trap 18 being detuned from the audio carrier frequency in accordance with the invention.

In operation, with selector 16 in the TV position, varactor diode 40 is biased by B+ and the voltage divided comprising resistors 13, 15 and 17 to exhibit a low capacity which in conjunction with the remaining elements in trap 18, tunes trap 18 to the audio carrier frequency. Trap 18 thus functions normally to absorb energy at the audio carrier frequency from the IF signal from tuner means 10. Upon movement of selector 16 to the cable position, varactor diode 40 is biased to a high capacity condition to alter the frequency response of trap 18. Specifically, its frequency response is changed such that it does not absorb energy at the audio carrier frequency. Trap 18 is effectively disabled which results in the frequency response indicated by the dashed line curve. It should be noted that when selector 16 is in the cable position, the transmitted audio signal is significantly reduced with respect to the picture or video carrier as above-described and consequently, the 920 KHz interference problem is substantially reduced. Thus, the omission of trap 18 does not deteriorate performance of the TV receiver in this respect. Its omission, however, does enhance the ability of the IF amplifier, in particular a SAW IF amplifier, to effectively operate with the reduced level audio carrier in the cable signal by enabling it to be amplified to a substantially greater degree.

Accordingly, the invention provides optimum performance for both off-air and cable signals in a TV receiver. Since the switching of the trap is tied to the selector in the tuner means, the benefits of the invention are obtained without requiring any additional knowledge or effort by the viewer. It will also be appreciated that the technique of switching the trap need not be restricted to that illustrated, the invention contemplating any suitable means for switching.

It is recognized that numerous changes and modifications in the described embodiment of the invention will be apparent to those skilled in the art without departing from its true spirit and scope. The invention is to be limited only as defined in the claims.

What is claimed is:

1. A television receiver for use with off-air and cable signals comprising:
   tuner means for receiving said signals and for developing therefrom an IF signal having a video carrier and an audio carrier;
   said tuner means further including switch means having a cable position and an off-air position for selectively operating said tuner means with said off-air and said cable signals to develop said IF signal;
   detecting means for receiving said IF signal and for developing therefrom audio and video information;
   trap means coupled between said tuner means and said detecting means for reducing the level of said audio carrier with respect to said video carrier in said IF signal; and
   circuit means, operable responsive to said switch means, for reducing the effectiveness of said trap means for cable signals by detuning said trap means.

2. The receiver of claim 1 wherein said circuit means comprise diode means coupled to said trap means, said diode means exhibiting a particular capacitance for detuning said trap means in response to said switch means being in said cable position.

3. A cable-ready television receiver for use with both off-air and cable signals comprising:
   turner means for receiving said signals and for developing a fixed frequency IF signal therefrom;
   IF amplifier means comprising a SAW filter coupled to said tuner means;
   detecting means for developing audio and video carriers coupled to said SAW filter;
   an LC trap coupled to the input of said SAW filter, said LC trap attenuating said IF signals at the frequency of said audio carrier;
   switch means in said tuner means for selectively operating said tuner means with said off-air and said cable signals to provide said IF signal;
   diode means coupled across said LC trap, said diode means exhibiting a particular capacitance; and
   voltage means responsive to said switch means for changing the capacitance exhibited by said diode means thereby reducing the effect of said LC trap when said tuner means is receiving said cable signals.

4. The combination of claim 3 wherein said diode means comprises a varactor diode and means for applying different DC voltages from said voltage means to said varactor diode.

* * * * *